United States Patent
Saito et al.

(10) Patent No.: US 8,026,801 B2
(45) Date of Patent: Sep. 27, 2011

(54) ACCELERATOR LEVEL DISPLAY DEVICE AND ACCELERATOR LEVEL DISPLAY METHOD

(75) Inventors: Kan Saito, Okazaki (JP); Akito Adachi, Susono (JP); Hatsuo Nakao, Gotenba (JP); Hiroshi Tsujii, Mishima (JP); Osamu Komeda, Mishima (JP); Haruyuki Kodera, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 338 days.

(21) Appl. No.: 12/440,639

(22) PCT Filed: Oct. 23, 2007

(86) PCT No.: PCT/JP2007/070606
§ 371 (c)(1),
(2), (4) Date: Mar. 10, 2009

(87) PCT Pub. No.: WO2008/050741
PCT Pub. Date: May 2, 2008

(65) Prior Publication Data
US 2009/0251304 A1    Oct. 8, 2009

(30) Foreign Application Priority Data

Oct. 25, 2006  (JP) .................................. 2006-290318
Feb. 7, 2007   (JP) .................................. 2007-028403

(51) Int. Cl.
*B60Q 1/00* (2006.01)
*B60Q 1/50* (2006.01)
*G06F 19/00* (2011.01)

(52) U.S. Cl. ........ 340/441; 340/461; 340/467; 340/525; 701/70; 701/123

(58) Field of Classification Search .................. 340/441, 340/467, 461
See application file for complete search history.

(56) References Cited

U.S. PATENT DOCUMENTS

2005/0021222 A1*  1/2005  Minami et al. ................ 701/123

FOREIGN PATENT DOCUMENTS

| JP | 57-137744 U   | 8/1982  |
|----|---------------|---------|
| JP | 9050547 A     | 2/1997  |
| JP | 11-024612 A   | 1/1999  |
| JP | 2002-362185 A | 12/2002 |
| JP | 2002-370560 A | 12/2002 |
| JP | 2003-220851 A | 8/2003  |
| JP | 2005-335669 A | 12/2005 |
| JP | 2006-057484 A | 3/2006  |

* cited by examiner

*Primary Examiner* — Donnie Crosland
(74) *Attorney, Agent, or Firm* — Sughrue Mion, PLLC

(57) ABSTRACT

A disclosed accelerator level display device 1 includes an accelerator level detection unit 12 configured to detect an accelerator level; a target accelerator level determining unit 14*b* configured to determine a target accelerator level for the accelerator level; and a display unit 15*a*, 20 configured to display a target accelerator level indicator corresponding to the target accelerator level and an accelerator level indicator corresponding to the detected accelerator level. The display unit is configured to display the target accelerator level indicator as a fixed value regardless of the target accelerator level determined by the target accelerator level determining unit.

8 Claims, 13 Drawing Sheets

ACCELERATOR LEVEL DISPLAY DEVICE AND ACCELERATOR LEVEL DISPLAY METHOD

TECHNICAL FIELD

The present invention generally relates to an accelerator level display device for displaying an accelerator level for a driver. More particularly, the present invention relates to an accelerator level display device and an accelerator level display method for displaying a current accelerator level together with a target accelerator level.

BACKGROUND ART

To improve fuel economy of vehicles, drivers are recommended, for example, to refrain from racing the engine, to stop idling the engine, and to avoid rapid acceleration. In addition to such operations that apparently lower fuel economy, fuel economy of a vehicle is also greatly influenced by how the accelerator is operated during driving. For this reason, display devices that display information for assisting a driver to improve the fuel economy are proposed (see, for example, patent documents 1 and 2).

Patent document 1 discloses a display device that assists a driver to drive a vehicle in a fuel-efficient manner. If the driver selects a fuel-economy shift mode, the disclosed display device determines whether the manner of driving of the driver is suitable to improve the fuel economy, and turns on an eco-lamp if the manner of driving is suitable to improve the fuel economy or turns off the eco-lamp if not.

Patent document 2 discloses a display unit that compares calculated current fuel economy with a recommended driving pattern provided for each type of vehicle and displays information indicating appropriateness of driver's accelerator operations ("appropriate", "stop pressing", and "too much") in different colors to assist the driver to drive properly.

However, the display device disclosed in patent document 1 can provide only a small amount of information by turning on and off the eco-lamp according to the manner of driving of the driver. The eco-lamp only indicates whether the manner of driving is suitable to improve the fuel economy. Therefore, the driver cannot determine the degree he/she is allowed to depress the accelerator within a threshold for turning on or off the eco-lamp. As a result, a fuel-economy-conscious driver tends to drive the vehicle with a low accelerator level for a long period of time and may unintentionally lower the fuel economy. Also, when the driver operates the accelerator according to the eco-lamp, the driver tends to change the accelerator level frequently in the vicinity of the threshold for turning on or off the eco-lamp and may in turn lower the fuel economy.

The display device disclosed in patent document 2 calculates instantaneous fuel economy and compares the instantaneous fuel economy with fuel economy according to the recommended driving pattern. One problem is that since the instantaneous fuel economy is a value measured in the past, the display device cannot tell the driver how to operate the accelerator before the fuel economy decreases. Also, since the display device does not display causes of decrease in fuel economy, the driver cannot determine whether the decrease in fuel economy could have been prevented. Thus, with the display device of patent document 2, it is difficult to guide the driver to properly drive a vehicle to prevent decrease in fuel economy before it occurs. Also, as with the display device of patent document 1, the display device of patent document 2 does not tell the driver how much he/she is allowed to depress the accelerator before the accelerator level exceeds a threshold between "appropriate" and "too much".

[Patent document 1] Japanese Patent Application Publication No. 2003-220851
[Patent document 2] Japanese Patent Application Publication No. 2002-370560

DISCLOSURE OF INVENTION

Problems to be Solved by the Invention

One object of the present invention is to provide an accelerator level display device and an accelerator level display method that make it possible to display information for assisting a driver to operate an accelerator within a fuel-efficient operating range.

Means for Solving the Problems

An aspect of the present invention provides an accelerator level display device including an accelerator level detection unit configured to detect an accelerator level; a target accelerator level determining unit configured to determine a target accelerator level for the accelerator level; and a display unit (for example, an accelerator level display unit 15a and an accelerator level indicator 20) configured to display a target accelerator level indicator (for example, a target indicator level described later) corresponding to the target accelerator level and an accelerator level indicator (for example, current indicator level described later) corresponding to the detected accelerator level. The display unit is configured to display the target accelerator level indicator as a fixed value regardless of the target accelerator level determined by the target accelerator level determining unit.

This configuration makes it possible to display a current level relative to a target level and allows a driver to determine the amount of depressing an accelerator necessary to achieve the target level and to properly operate the accelerator before the fuel economy becomes low. Also, with this configuration, because the target level is displayed as a fixed value, the driver can easily understand displayed information and operate the accelerator based solely on the current level.

Advantageous Effect of the Invention

An aspect of the present invention makes it possible to provide an accelerator level display device capable of displaying information for assisting a driver to operate an accelerator within a fuel-efficient operating range.

EXPLANATION OF REFERENCES

Figure 1:
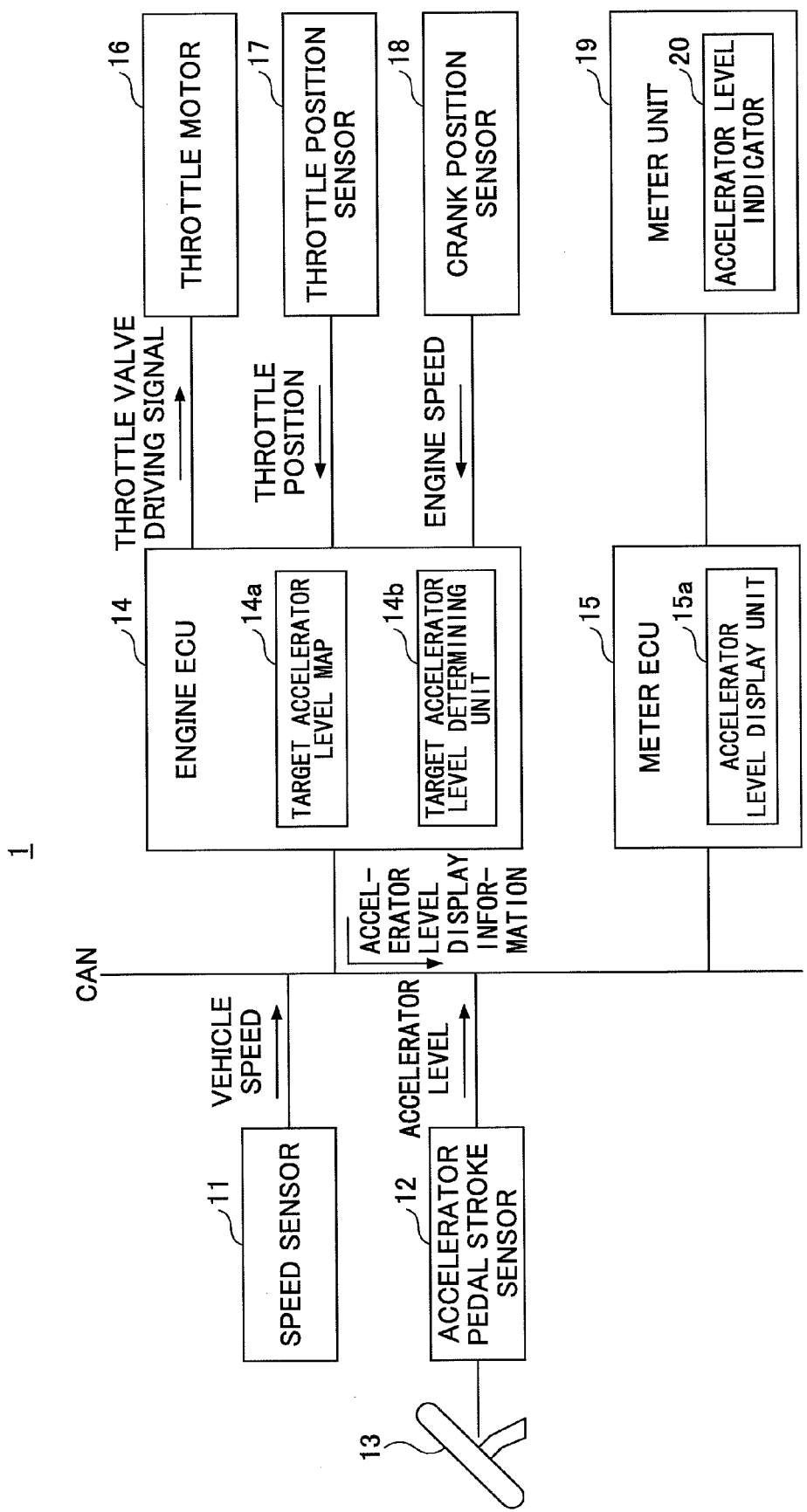
FIG. 1 is a functional block diagram of an accelerator level display device.

1 Accelerator level display device
11 Speed sensor
12 Accelerator pedal stroke sensor
13 Accelerator pedal
14 Engine ECU
14a Target accelerator level map
14b Target accelerator level determining unit
14c Fluctuation calculation unit
15 Meter ECU
15a Accelerator level display unit
16 Throttle motor
17 Throttle position sensor
18 Crank position sensor
19 Meter unit
20 Accelerator level indicator
21 Transmission ECU
34 Multi-information display

BEST MODE FOR CARRYING OUT THE INVENTION

The best mode for carrying out the invention is described based on the following embodiments with reference to the accompanying drawings.

First Embodiment

An accelerator level display device 1 of a first embodiment is configured to display information for assisting a driver to operate an accelerator in a fuel-efficient range to efficiently drive an engine and a drive train. This embodiment makes it possible to display a current accelerator level together with a target accelerator level instead of just displaying binary information indicating whether the current accelerator level is fuel-efficient. This configuration allows the driver to adjust the accelerator level such that it does not exceed the target accelerator level and to drive a vehicle in a fuel-efficient manner.

FIG. 1 is a functional block diagram of the accelerator level display device 1. The accelerator level display device 1 includes sensors for detecting driving and operation conditions, an engine electrical control unit (ECU) 14, and a meter ECU 15 that are connected to each other via an in-vehicle LAN such as a controller area network (CAN). Each of the meter ECU 15 and the engine ECU 14 is implemented by a microcomputer including a CPU for executing programs, a RAM used as a work area or a temporary storage during execution of the programs, an electronically erasable and programmable read only memory (EEPROM) that retains data even when the ignition is turned off, an input/output interface that inputs and outputs data and is used to interface the ECUs, a communication controller for communications between the ECUs, and a ROM for storing the programs. Those components are connected to each other via a bus. The engine ECU 14 includes a target accelerator level determining unit 14b that determines a target accelerator level and is implemented by executing a program by the CPU. The meter ECU 15 includes an accelerator level display unit 15a that controls information to be displayed on an accelerator level indicator 20 and is implemented by executing a program by the CPU. The engine ECU 14 also includes a target accelerator level map 14a described later that is stored, for example, in the ROM.

A speed sensor 11 detects pulses, i.e., changes in magnetic flux, generated when protrusions, disposed, for example, at regular intervals along the circumference of a rotor of each wheel, pass through a detector. The speed sensor 11 measures the speed of the vehicle based on the number of pulses per unit sampling time. An accelerator pedal stroke sensor 12 detects an accelerator level based on the intensity of a magnetic field passing through a Hall generator which changes according to the amount of depressing an accelerator pedal 13.

The engine ECU 14 performs a basic control of the engine, a fuel injection control of controlling the amount of fuel to be injected according to the accelerator level, and an ignition timing control of turning on spark plugs at proper timings. Thus, the engine ECU 14 is used to properly control the engine. To the engine ECU 14, a crank position sensor 18 for detecting the engine speed based on the positions of a crank, a throttle position sensor 17 for detecting a throttle position, and a throttle motor 16 for opening and closing a throttle valve are connected. The engine ECU 14 causes the throttle motor 16 to drive the throttle valve according to the accelerator level. Also, the engine ECU 14 detects the throttle position via the throttle position sensor 17 and controls the throttle position according to the accelerator level. Further, the engine ECU 14 controls the engine speed during idling and controls the engine speed during constant-speed driving (e.g., when the vehicle is on cruise control).

The meter ECU 15 receives signals from sensors, other ECUs, and switches, displays vehicle conditions such as the vehicle speed and the engine speed, and turns on alarms such as a half-shut door alarm. In this embodiment, the meter unit 19 includes the accelerator level indicator 20 for displaying a fuel-efficient accelerator level.

The accelerator level display unit 15a causes the accelerator level indicator 20 to display accelerator levels according to accelerator level display information sent from the engine ECU 14. The accelerator level display information includes a target accelerator level and a current accelerator level. The accelerator level display unit 15a converts the accelerator level display information into levels to be displayed on the accelerator level indicator 20.

Figure 2:
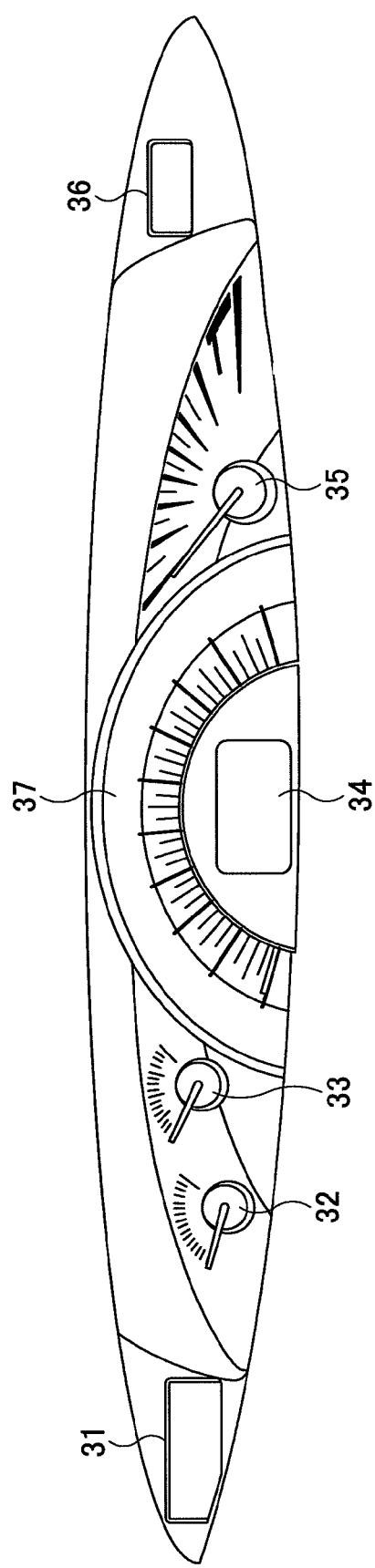
FIG. 2 is a drawing illustrating an exemplary meter unit provided on an instrument panel.

FIG. 2 is a drawing illustrating the meter unit 19 provided on an instrument panel. The meter unit 19, for example, includes a water temperature meter 32 for showing the temperature of engine cooling water with a needle driven by a stepper motor, a fuel meter 33 for showing the amount of remaining fuel detected by a fuel gauge, a speed meter 37 for showing the vehicle speed, and a tachometer 35 for showing the engine speed. An odometer/tripmeter 31 is a liquid crystal display that interchangeably displays an odometer and a tripmeter and is also able to display a current gear shift position (e.g., N, D, P, R). A clock 36 is a liquid crystal display for displaying current time.

A multi-information display (MID) 34 in the center is a dot-matrix liquid crystal display for displaying various types of information in numbers and characters (digital values) and by the sizes of symbols and marks (analog values). For example, the MID 34 displays instantaneous fuel economy, average fuel economy, a possible travel distance based on the average fuel economy and the remaining amount of fuel, an average vehicle speed, and messages for assisting the driver. The MID 34 displays various types of information according to buttons pressed. When the corresponding button is pressed, the MID 34 displays the accelerator level indicator 20 for displaying accelerator levels.

Since the driver operates the accelerator pedal 13 during driving, it is preferable to project the accelerator level indicator 20 onto the windshield with a head-up display so that the driver does not have to move the eyes much. Alternatively, a display unit dedicated for the accelerator level indicator 20 may be provided in the meter unit 19.

The accelerator level indicator 20 is described below. The accelerator level indicator 20 displays a fuel-efficient accelerator level without relying on instantaneous fuel economy.

Figure 3:
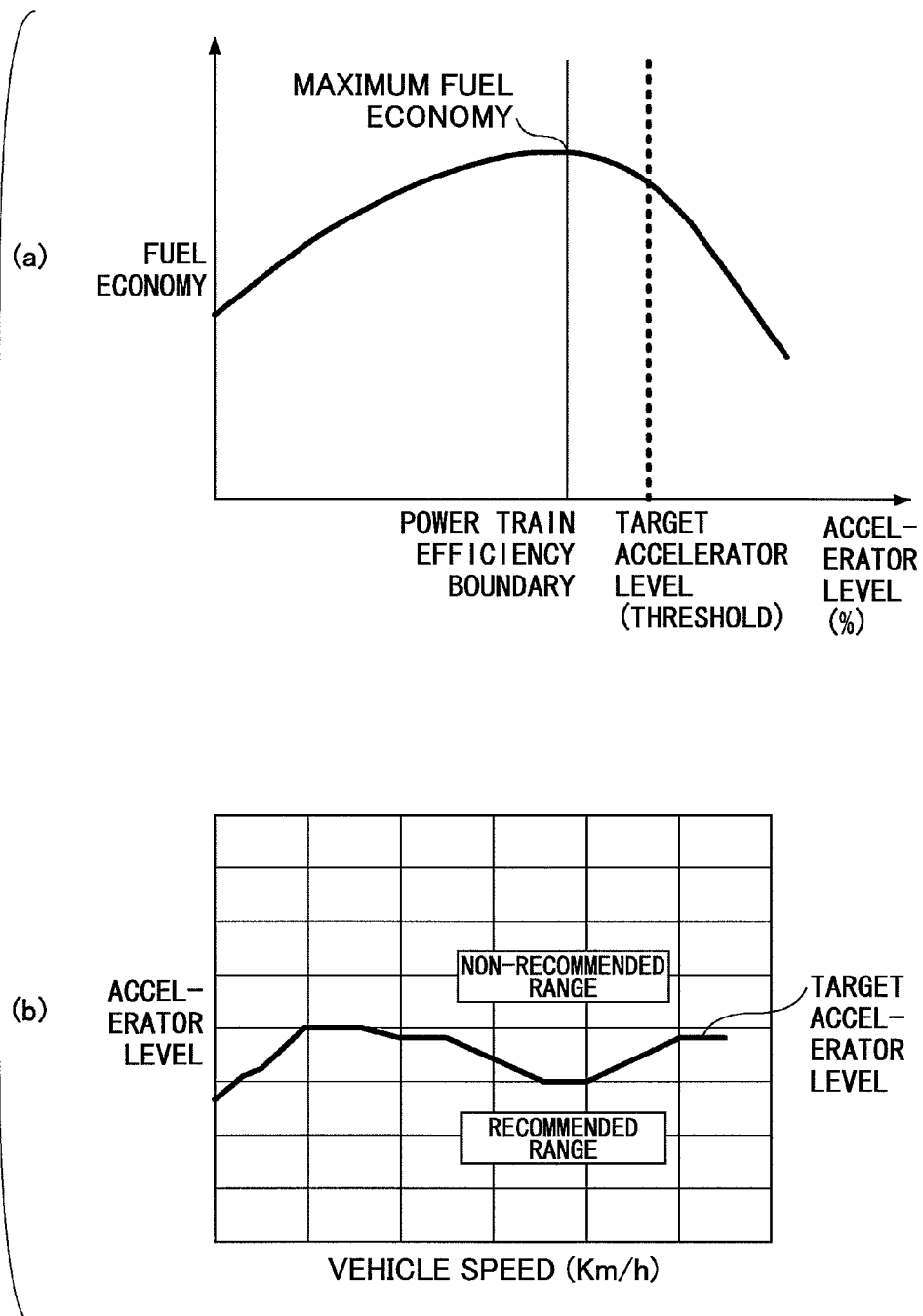
FIG. 3 is a drawing used to describe a recommended range and a non-recommended range of accelerator levels.

FIG. 3 (*a*) shows an example of a relationship between the accelerator level and the fuel economy. In a low range where the accelerator level is low, the power train efficiency is low and the fuel economy tends to become low. In a high range where the accelerator level is high, the fuel economy also tends to become low because of excessive fuel injection. The fuel economy is maximized when the accelerator level is between the high range and the low range (most fuel-efficient accelerator level). Good running performance can be achieved when the accelerator level is near the most fuel-efficient accelerator level. However, driving a vehicle with an accelerator level lower than the most fuel-efficient accelerator level may reduce the drivability. Therefore, in this embodiment, an accelerator level slightly higher than the most fuel-efficient accelerator level is used as a threshold (target accelerator level) and the accelerator level display device 1 assists the driver to drive the vehicle with an accelerator level lower than or equal to the target accelerator level. This configuration makes it possible to provide a target accelerator level that is easy to achieve for many drivers.

Meanwhile, the transmission efficiency of a power train (including a clutch, a transmission, a propeller shaft, a differential gear, and a drive shaft) changes depending on the vehicle speed and therefore the target accelerator level also changes depending on the vehicle speed. For this reason, in this embodiment, target accelerator levels suitable for respective vehicle speeds are stored as the target accelerator level map 14*a*. Alternatively, target accelerator levels may be calculated based on the vehicle speed and surrounding environments.

FIG. 3 (*b*) shows an example of a relationship between the vehicle speed and the target accelerator level. FIG. 3 (*b*) represents an example of the target accelerator level map 14*a*. In FIG. 3 (*b*), a range where the accelerator level is greater than the target accelerator level is called a non-recommended range and a range where the accelerator level is less than or equal to the target accelerator level is called a recommended range. The accelerator level indicator 20 is used to assist the driver to drive the vehicle with an accelerator level in the recommended range.

In this embodiment, the target accelerator level is displayed together with a current accelerator level. The driver is recommended to increase the accelerator level when the current accelerator level is lower than the target accelerator level or to decrease the accelerator level when the current accelerator level is greater than the target accelerator level.

Figure 4:
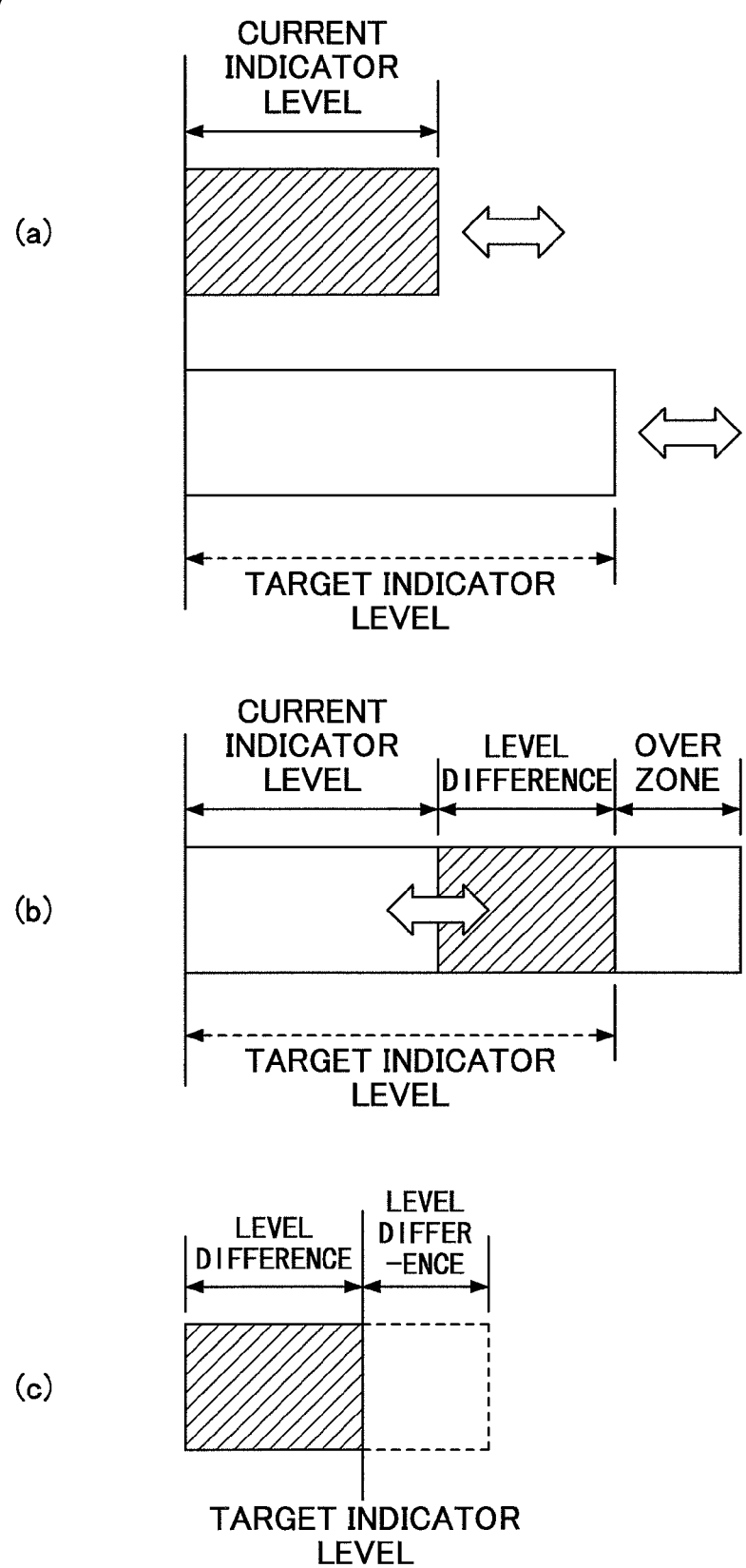
FIG. 4 is a drawing illustrating analog accelerator level indicators for displaying current and target indicator levels.

FIG. 4 (*a*) shows exemplary analog display of a current accelerator level and a target accelerator level (hereafter, a current accelerator level displayed on the MID 34 is called a current indicator level and a target accelerator level displayed on the MID 34 is called a target indicator level). The manner of displaying information in FIG. 4 (*a*) is not convenient for the driver. In FIG. 4 (*a*), the target indicator level changes as the vehicle speed changes and the current indicator level also changes according to accelerator operations by the driver. In other words, the current indicator level and the target indicator level change independently from each other. For example, the target indicator level may decrease when the current indicator level increases (or vise versa) and the difference between the target indicator level and the current indicator level may change irregularly. Therefore, with the display method of FIG. 4 (*a*), it is difficult for the driver to adjust the accelerator level according to the target indicator level.

In this embodiment, the accelerator level display unit 15*a* combines the current indicator level and the target indicator level into one display element for easy understanding by the driver. FIG. 4 (*b*) shows an example of the accelerator level indicator 20 displayed on the MID 34. In FIG. 4 (*b*), to display the target and current indicator levels as one display element, the current indicator level is represented by the proportion of the current indicator level to the target indicator level (a value obtained by dividing the current indicator level by the target indicator level) and the target indicator level is represented by a rectangle with a fixed length.

With this display method, the length of a rectangle representing the current indicator level changes relative to the fixed target indicator level according to accelerator operations and the driver can operate the accelerator based on the current indicator level or the difference (hereafter called a level difference) between the target indicator level and the current indicator level. In FIG. 4 (*b*), an area to the right of the target indicator level is called an over zone where the fuel economy decreases rapidly and the right end of the over zone indicates, for example, the maximum accelerator level.

FIG. 4 (*c*) shows another example of displaying the target and current indicator levels as one display element where the target indicator level is displayed at a fixed position and the level difference is displayed relative to the target indicator level. In FIG. 4 (*c*), a level difference to the left of the target indicator level indicates that the accelerator can be depressed further up to the target indicator level and a level difference to the right of the target indicator level indicates that the accelerator is depressed too much.

With the accelerator level indicator 20 as shown in FIG. 4 (*b*) or (*c*), the driver can adjust the accelerator level such that the level difference becomes zero. In this embodiment, the current indicator level to be displayed is obtained by averaging accelerator levels output from the accelerator pedal stroke sensor 12 every time cycle so that the current indicator level does not change too frequently. Areas in the accelerator level indicator 20 may be displayed in different colors.

[Nonlinear Display]

To improve the fuel-economy of a vehicle, it is preferable to effectively assist the driver to keep the accelerator level within the recommended range. Also, since the fuel economy continuously changes even within the recommended range due to engine control operations by the engine ECU 14, it is preferable to prevent the current indicator level from entering the over zone by quickly detecting the change in the current indicator level just before the over zone.

In this embodiment, the accelerator level display unit 15a performs a nonlinear conversion process such that a small change in the accelerator level close to the target accelerator level is displayed as a large change by the accelerator level indicator 20.

Figure 5:
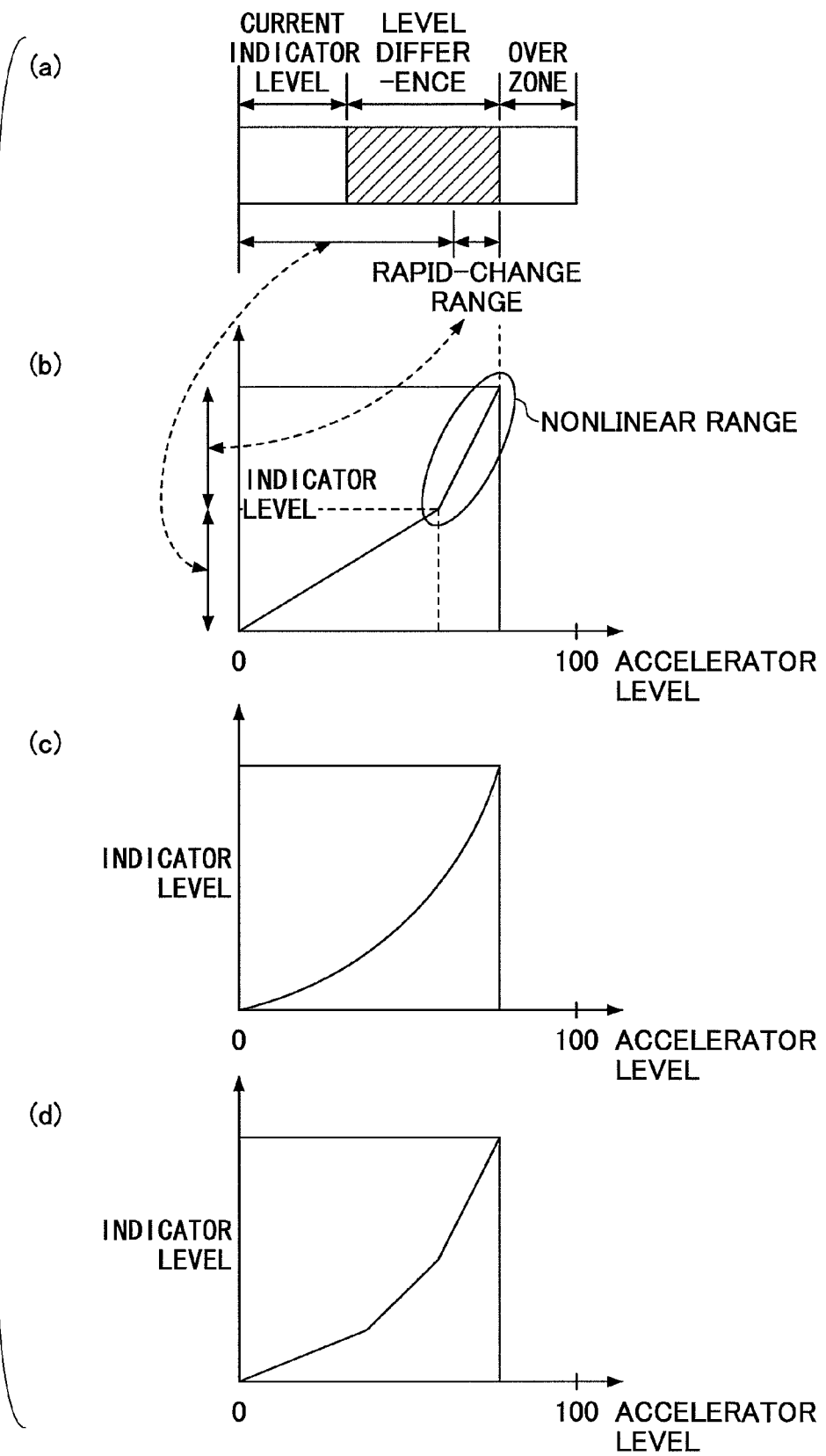
FIG. 5 is a drawing used to describe an accelerator level indicator that displays a change in a current indicator level in nonlinear proportion to a change in an accelerator level.

FIG. 5 (*a*) shows an example of the accelerator level indicator 20, and FIG. 5 (*b*) shows an example of a nonlinear relationship between a change in the accelerator level and a change in the current indicator level to be displayed. In a rapid-change range of the accelerator level indicator 20 shown in FIG. 5 (*a*), the rate of change of the current indicator level is greater than the rate of change of the accelerator level. In FIG. 5 (*b*), the rapid-change range corresponds to a nonlinear range. In the rapid-change range, the current indicator level increases more rapidly than the accelerator level increases. In ranges other than the rapid-change range, the rate of change of the current indicator level is substantially the same as the rate of change of the accelerator level.

The range of the accelerator level corresponding to the rapid-change range, for example, corresponds to a range between the power train efficiency boundary and the target accelerator level shown in FIG. 3 (*a*). In the range (fuel-economy decreasing range) between the power train efficiency boundary and the target accelerator level, the fuel economy gradually decreases. Therefore, in the fuel-economy decreasing range, a small change in the accelerator level is displayed as a large change in the current indicator level so that it becomes more noticeable. With this method, when the driver increases the accelerator level a little in the rapid-change range, the current indicator level increases greatly and becomes closer to the target indicator level more rapidly than in other ranges. This makes it easier for the driver to quickly take an action (e.g., reduce the accelerator level) based on the current indicator level (or level difference) displayed.

According to the nonlinear conversion process shown by FIGS. 5 (*a*) and (*b*), the difference between the target and current indicator levels when the difference between the current accelerator level and the target accelerator level is greater than or equal to a predetermined value (i.e., when the current accelerator level is in a range other than the rapid-change range) is displayed larger than the difference between the target and current indicator levels when the difference between the target accelerator level and the current accelerator level is less than the predetermined level (i.e., when the current accelerator level is in the rapid-change range).

Alternatively, the rate of change of the accelerator level and the rate of change of the current indicator level may be in a nonlinear relationship in all ranges up to the target indicator level. FIG. 5 (*c*) shows an example of a nonlinear relationship between an accelerator level and a current indicator level. In FIG. 5 (*c*), throughout all ranges up to the target indicator level, the ratio of the change in the current indicator level to the change in the accelerator level increases as the current indicator level becomes closer to the target indicator level. With this method, because the ratio of the change in the current indicator level to the change in the accelerator level gradually increases throughout all ranges, the driver can smoothly change the accelerator level.

Also, as shown by FIG. 5 (*d*), the ratio of the change in the current indicator level to the change in the accelerator level may be set at a small value in a range where the accelerator level is small and the ratio may be set at a large value in a range where the accelerator level is close to the target indicator level.

As described above, changing the current indicator level in a nonlinear relationship with the accelerator level in a fuel-economy decreasing range or a range close to the target indicator level makes it possible to display the change in the current indicator level in a more noticeable manner. This in turn makes it possible for a driver to drive a vehicle without using a fuel-inefficient accelerator level. In other words, the above embodiment makes it possible to improve the fuel economy by accurately adjusting the accelerator level. Further, the above embodiment makes it possible to visually show a decrease in fuel economy with an analog representation of the rate of change of the current indicator level. This visual interface allows the driver to intuitively understand the relationship between the current indicator level and the actual fuel economy and makes it possible to increase the driver's awareness of fuel-efficient accelerator operations.

[Display for Preventing Use Outside of Lock-Up Range]

Causing the accelerator level indicator 20 to display the current indicator level with a rate of change greater than the rate of change of the accelerator level is also preferable to guide the driver to operate the accelerator outside of a lock-up range. The transmission of an automatic vehicle is designed to be locked-up as often as possible to improve the transmission efficiency. However, when the accelerator level is greatly increased in a low-to-medium speed range, the transmission is unlocked to improve the power output and the response and as a result, the transmission efficiency is greatly reduced.

Figure 6:
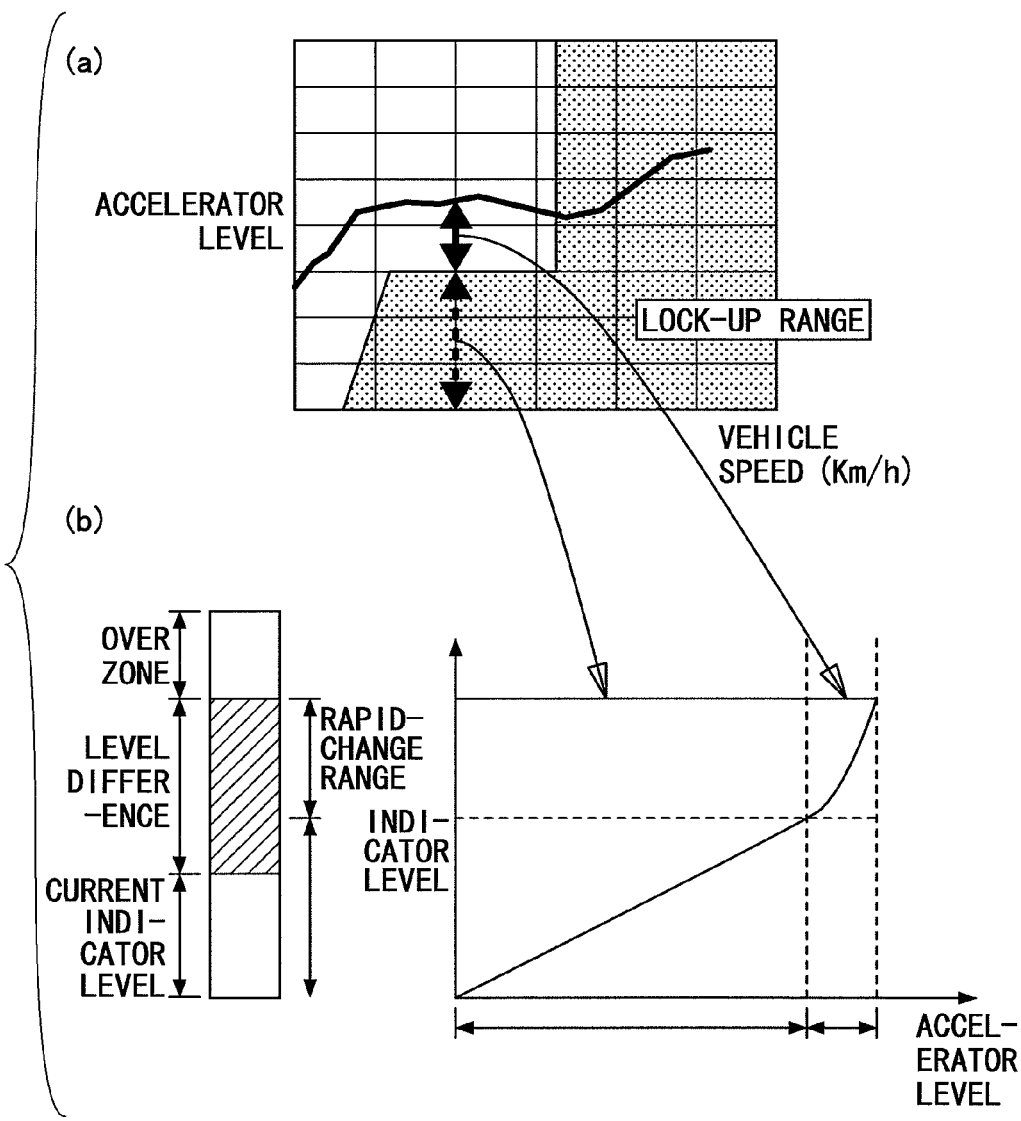
FIG. 6 is a drawing used to describe a nonlinear relationship between the rate of change of an accelerator level outside of a lock-up range and the rate of change of a current indicator level.

FIG. 6 (*a*) shows an example of a relationship between a lock-up range and a target accelerator level. If the target accelerator level is determined without taking into account the lock-up range and the accelerator is operated in a low-to-medium speed range to achieve the target accelerator level, the accelerator level exceeds the lock-up range and the fuel economy becomes low even when the accelerator level is near the target indicator level. Therefore, to improve the fuel economy in a speed range where the target accelerator level is not within the lock-up range, it is preferable to guide the driver, by the accelerator level indicator 20, to drive within the lock-up range.

For this purpose, the accelerator level display unit 15a is preferably configured to display the accelerator level outside of the lock-up range with a rate of change greater than the rate of change of the accelerator level in the lock-up range. FIG. 6 (*b*) shows an example of a relationship between the accelerator level and the current indicator level. In FIG. 6 (*b*), the accelerator level indicator 20 is shown in a vertical position for comparison with a graph. As shown in FIG. 6 (*b*), outside of the lock-up range, the rate of change of the current indicator level is greater than the rate of change of the accelerator level.

With this configuration, when a vehicle is running outside of the lock-up range, the rate of change of the current indicator level displayed on the accelerator level indicator 20 is greater than the rate of change of the accelerator level. This in turn allows the driver to quickly notice that the accelerator pedal 13 is depressed too much and to release the accelerator pedal 13, and thereby makes it possible to improve the fuel-economy.

[Display for Preventing Decrease in Fuel-Economy Due to Increase in Fuel Injection]

The engine ECU 14 controls the amount of fuel injection, the ignition timing, and the throttle position to achieve the maximum fuel economy. However, there are cases where the engine ECU 14 controls the engine in a fuel-inefficient manner to meet emission regulations. For example, when the accelerator level exceeds a predetermined level, the engine ECU 14 increases the amount of fuel injection to cool the catalyst.

Figure 7:
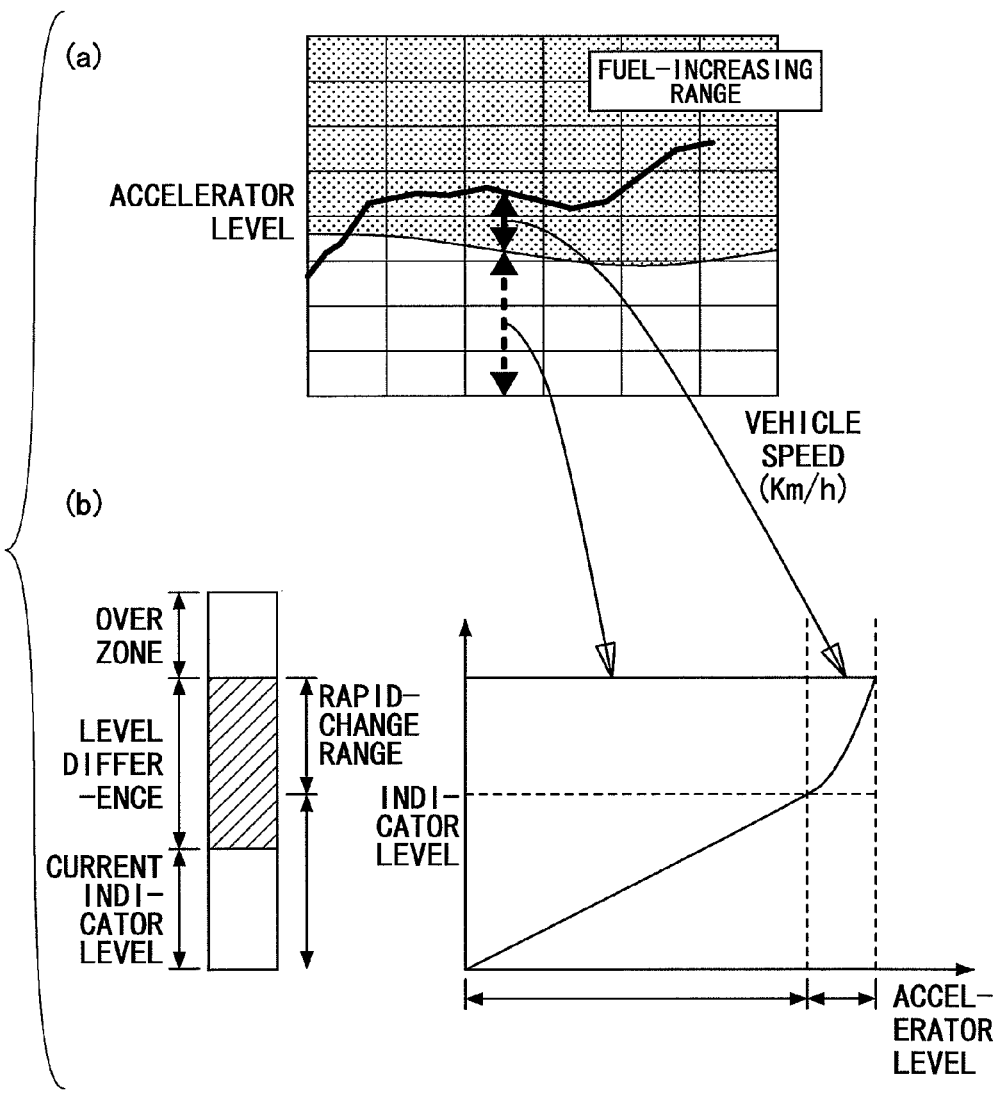
FIG. 7 is a drawing used to describe a nonlinear relationship between the rate of change of an accelerator level in a fuel increasing range and the rate of change of a current indicator level.

FIG. 7 (*a*) shows an example of a relationship between the target accelerator level and a fuel increasing range. Because the fuel economy decreases in the fuel increasing range, it is preferable to guide the driver to control the accelerator level within a range below the fuel increasing range even when the current accelerator level is substantially lower than the target accelerator level.

For this purpose, in the fuel increasing range, the accelerator level display unit 15*a* is preferably configured to display the current indicator level on the accelerator level indicator 20 with a rate of change greater than the rate of change of the accelerator level. FIG. 7 (*b*) shows an example of a relationship between the accelerator level and the current indicator level. In FIG. 7 (*b*), the accelerator level indicator 20 is shown in a vertical position for comparison with a graph. As shown in FIG. 7 (*b*), in the fuel increasing range, the rate of change of the current indicator level is greater than the rate of change of the accelerator level.

With this configuration, because the rate of change of the current indicator level becomes greater than the rate of change of the accelerator level when a vehicle is driven in the fuel increasing range, the driver can quickly notice that the accelerator pedal 13 is depressed too much and is encouraged to release the accelerator pedal 13. This in turn makes it possible to prevent the driver from driving in the fuel-increasing range and thereby to improve the fuel economy.

[Display for Preventing Use of Low-Engine-Efficiency Range]

Figure 8:
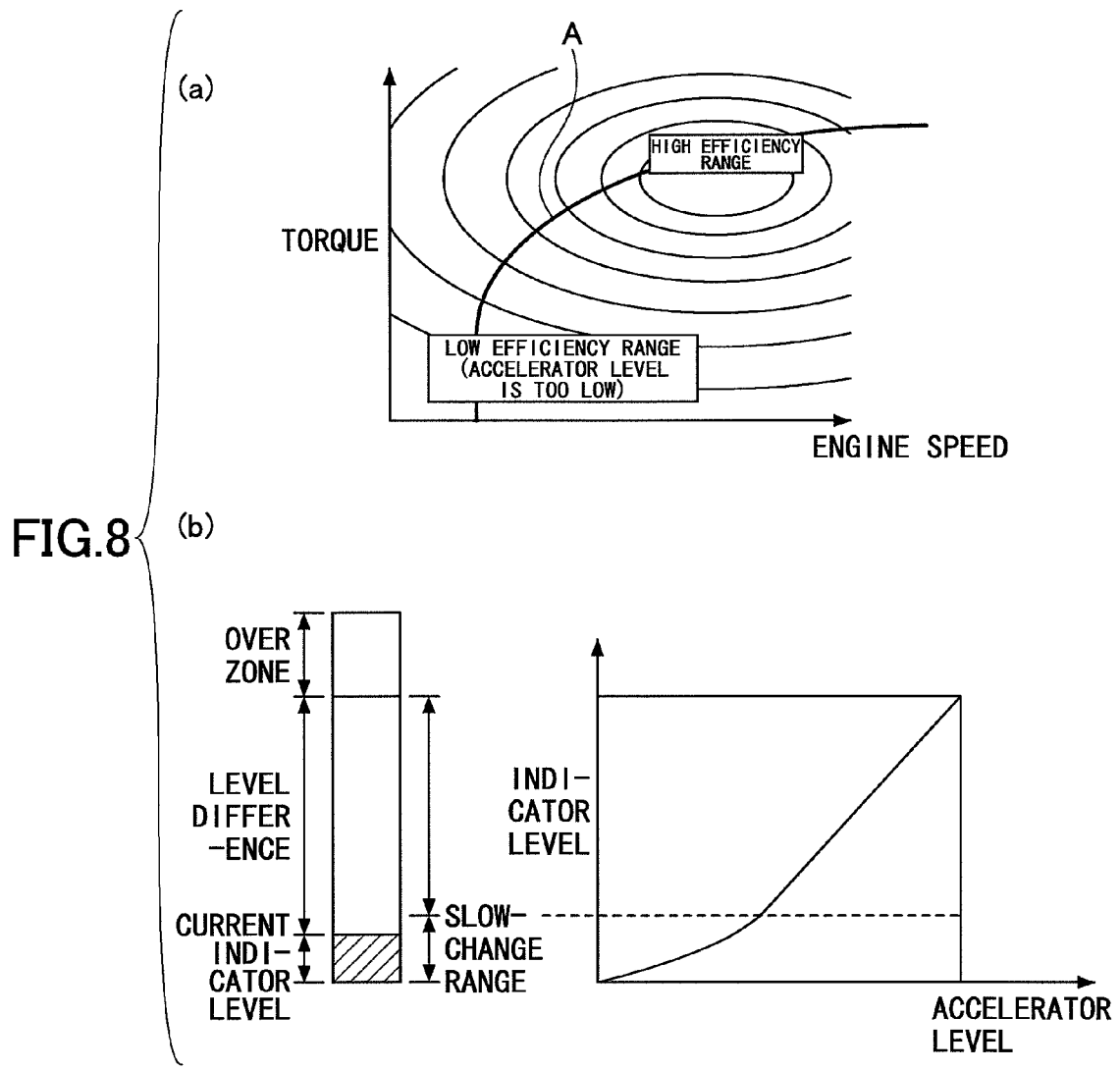
FIG. 8 is a drawing used to describe a nonlinear relationship between the rate of change of an accelerator level in a low engine-speed range and the rate of change of a current indicator level.

FIG. 8 (*a*) shows an example of a relationship between the engine speed and the engine efficiency. When a vehicle accelerates from a low-speed range to a middle-to-high speed range, the relationship between the engine speed and the torque changes as indicated by a transition line A. Generally, the engine efficiency of a vehicle is low in a low-speed range where the engine speed is low and the load is high, and the engine efficiency increases as the engine speed increases. Therefore, to improve the fuel economy, it is preferable to reduce the amount of time when a vehicle is driven with a low engine speed (with a low accelerator level).

For this purpose, in a low accelerator level range, the accelerator level display unit 15*a* is preferably configured to display the current indicator level on the accelerator level indicator 20 with a rate of change less than the rate of change of the accelerator level. FIG. 8 (*b*) shows an example of a relationship between the accelerator level and the current indicator level. In FIG. 8 (*b*), the accelerator level indicator 20 is shown in a vertical position for comparison with a graph. In a slow-change range of the accelerator level indicator 20, the rate of change of the current indicator level is less than the rate of change of the accelerator level.

In the low accelerator level range, because the current indicator level does not change much even if the accelerator level is increased, the driver notices that there is a large gap between the current indicator level and the target indicator level. This configuration makes it possible to guide the driver to depress the accelerator pedal 13 in a low engine-efficiency range to quickly increase the accelerator level, and thereby makes it possible to improve the fuel economy.

As described above, the difference between the target and current indicator levels when the difference between the current accelerator level and the target accelerator level is greater than or equal to a predetermined value (i.e., when the current accelerator level is in the slow-change range) is displayed larger than the difference between the target and current indicator levels when the difference between the target accelerator level and the current accelerator level is less than the predetermined value (i.e., when the current accelerator level is in a range other than the slow-change range). This configuration makes it possible to allow the driver to easily notice a large gap between the current indicator level and the target indicator level and to guide the driver to quickly increase the accelerator level.

[Operations of Accelerator Level Display Device 1]

Figure 9:
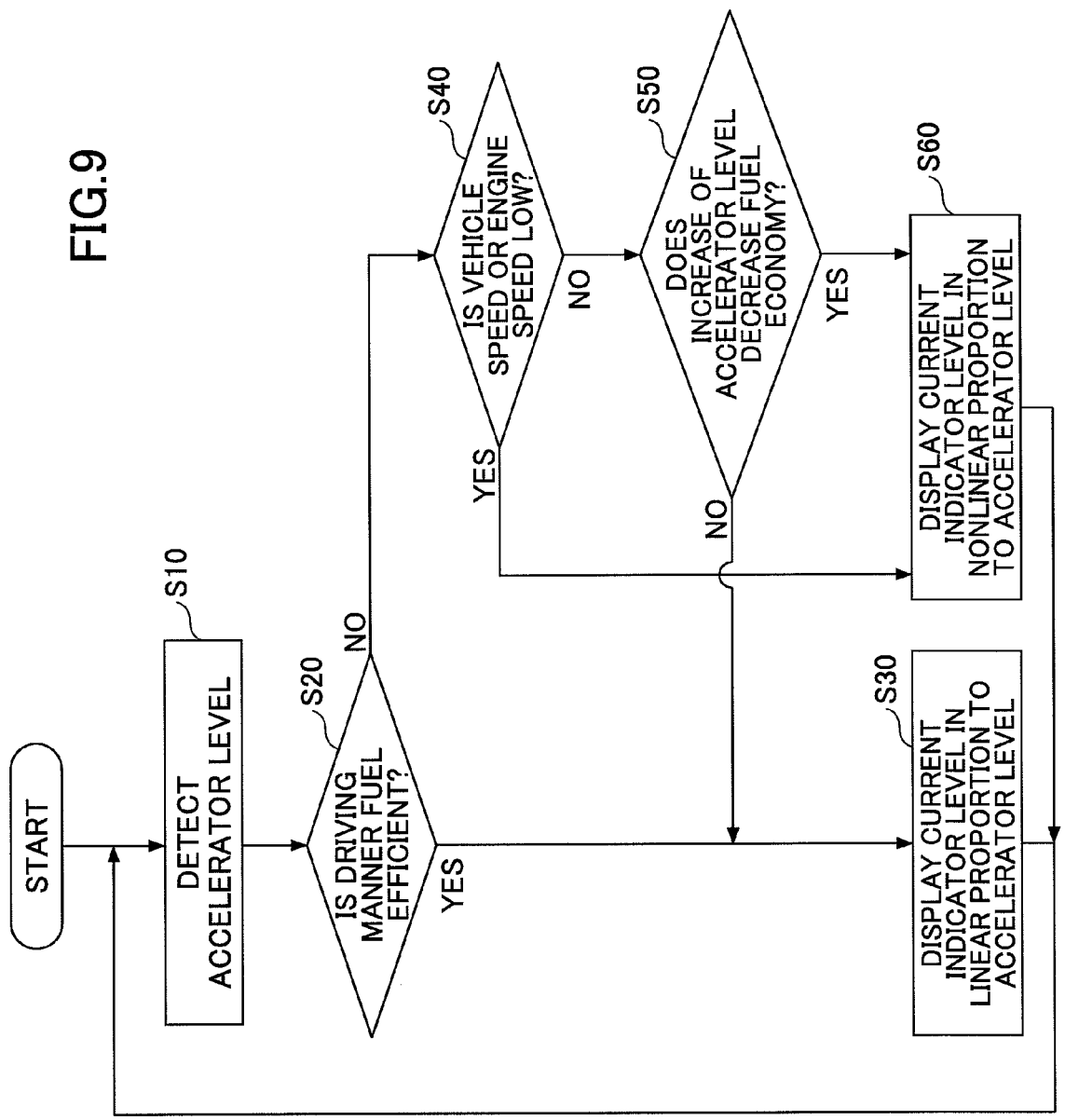
FIG. 9 is a flowchart showing a process performed by an accelerator level display device to display a current indicator level on an accelerator level indicator.
Figure 9:
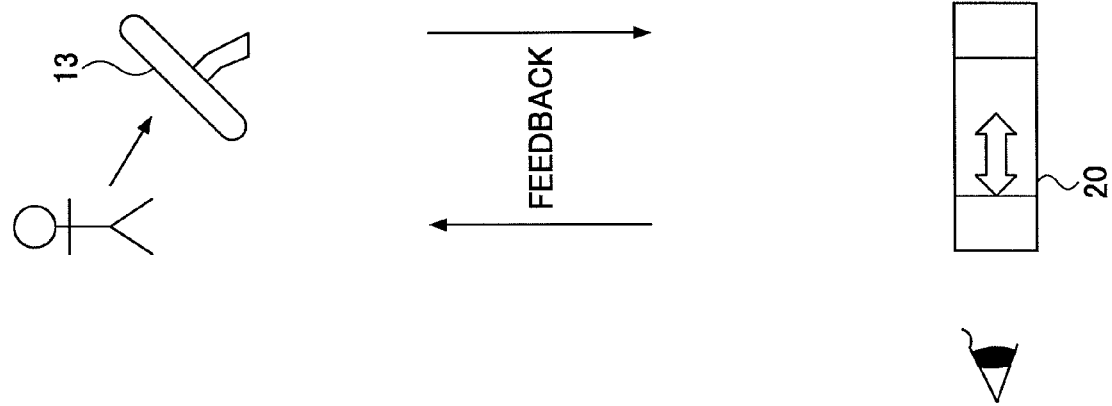

FIG. 9 is a flowchart showing a process performed by the accelerator level display device 1 to display a current indicator level on the accelerator level indicator 20. The process shown in FIG. 9 is started, for example, when the ignition is turned on. In the process shown in FIG. 9, it is assumed that the current indicator level is displayed in nonlinear proportion to the accelerator level in a fuel-inefficient range where the accelerator level is comparatively high (one or more of a range near the target indicator level, a range outside of the lock-up range, and the fuel increasing range) and in a low engine-efficiency range as shown, for example, in FIGS. 5 (*c*) and (*d*).

When the driver operates the accelerator pedal 13, the accelerator pedal stroke sensor 12 detects a current accelerator level (S10). The detected current accelerator level is sent to the engine ECU 14 every time cycle. The target accelerator level determining unit 14*b* selects a target accelerator level from the target accelerator level map 14*a* based on the current accelerator level and the vehicle speed and sends accelerator level display information to the meter ECU 15.

The accelerator level display unit 15*a* compares the target accelerator level and the current accelerator level to determine whether the manner of driving is fuel efficient (S20). Whether the manner of driving is fuel efficient is determined based on whether the current accelerator level is in a high or low range where the current indicator level is displayed nonlinearly. If the current accelerator level is in the high or low range, the accelerator level display unit 15*a* determines that the manner of driving is not fuel efficient.

If the manner of driving is fuel efficient (YES in S20), the accelerator level display unit 15*a* displays a current indicator level on the accelerator level indicator 20 in linear proportion to the current accelerator level (S30).

If the manner of driving is not fuel efficient (NO in S20), the accelerator level display unit 15*a* determines whether the low efficiency is caused by a low vehicle speed or engine speed (S40). If the low efficiency is caused by a low vehicle speed or engine speed (YES in S40), the accelerator level display unit 15*a* displays a current indicator level with a rate of change less than the rate of change of the current accelerator level (S60).

If the low efficiency is not caused by a low vehicle speed or engine speed (NO in S40), the accelerator level display unit 15*a* determines whether increasing the accelerator level decreases the fuel economy greatly (S50).

If increasing the accelerator level decreases the fuel economy greatly (YES in S50), the accelerator level display unit 15*a* displays a current indicator level with a rate of change greater than the rate of change of the current accelerator level (S60). If increasing the accelerator level does not decrease the fuel economy greatly (NO in S50), the accelerator level display unit 15*a* displays a current indicator level on the accelerator level indicator 20 in linear proportion to the current accelerator level (S30).

With the accelerator level display device 1 as described above, the driver can appropriately adjust the accelerator level based on information displayed on the accelerator level indicator 20. For example, if the current accelerator level is not fuel efficient because of a low vehicle speed or engine speed, the driver can promptly increase the accelerator level to improve the fuel economy.

[Variations of Accelerator Level Indicator 20]

Figure 10:
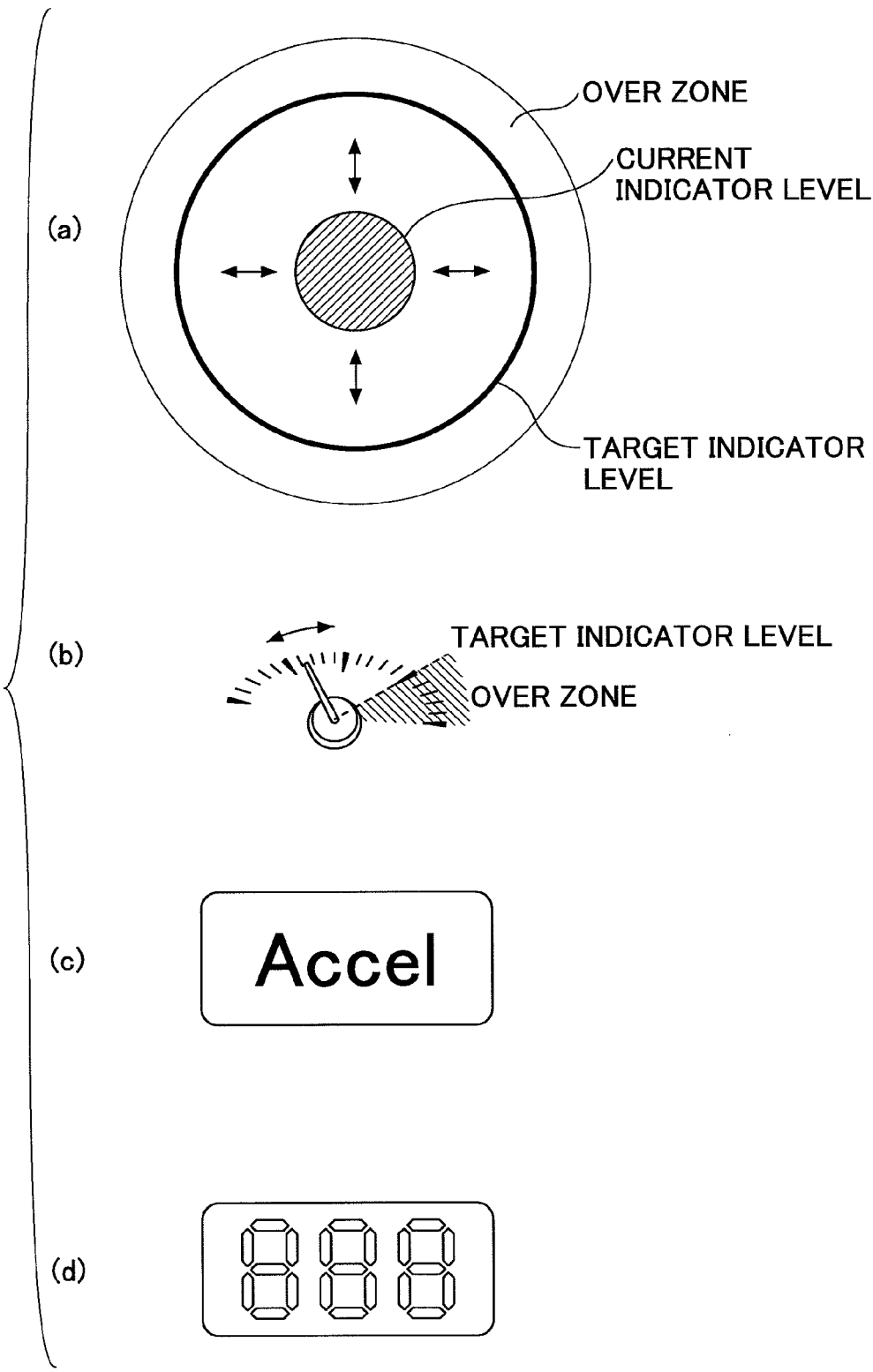
FIG. 10 is a drawing illustrating variations of an accelerator level indicator.

FIG. 10 shows variations of the accelerator level indicator 20. Any type of the accelerator level indicator 20 may be used as long as it is capable of displaying a current indicator level relative to a fixed target indicator level. FIG. 10 (a) shows a circle-shaped accelerator level indicator 20. In the circle-shaped accelerator level indicator 20, a fixed target indicator level and an over zone are indicated by concentric circles and a current indicator level is indicated by the size of a center circle. Instead of circles, the levels may be indicated by other shapes (for example, polygons such as a triangle and a rectangle).

FIG. 10 (b) shows a needle-type accelerator level indicator 20. The needle-type accelerator level indicator 20 indicates a current indicator level with a needle relative to a fixed target indicator level.

FIG. 10 (c) shows an accelerator level indicator 20 that indicates accelerator levels with different colors. The accelerator level indicator 20 of FIG. 10 (c) changes colors of a mark or symbol (in this example, "Accel") indicating the accelerator level according to the current indicator level. For example, the color of a mark is gradually changed from green to yellow and from yellow to red as the current indicator level becomes closer to the target indicator level. In this case, when the mark becomes red indicating that the current indicator level has reached the target indicator level, the mark may also be caused to blink to make it easier for the driver to notice it. Alternatively, an alarm sound may be output when the current indicator level reaches the target indicator level. In a nonlinear display range, the speed of changing the colors may be increased or the mark may be caused to blink before the mark becomes red. It is also preferable to incorporate the color change feature into the circle-shaped or needle-type accelerator level indicator 20 to improve the visibility.

FIG. 10 (d) shows a digital accelerator level indicator 20 that indicates an accelerator level with a numeric value. In this case, the accelerator level display unit 15a displays a current indicator level with a numeric value with respect to a target indicator level of 100. With the digital accelerator level indicator 20, the driver can recognize the current indicator level with a numeric value.

The first embodiment provides the accelerator level display device 1 that displays a target accelerator level and a current accelerator level in an analog manner and thereby assists the driver to operate the accelerator with a fuel-efficient accelerator level before the fuel economy decreases. Also, the accelerator level display device 1 displays the current indicator level in nonlinear proportion to the current accelerator level in a fuel-inefficient accelerator level range and thereby makes it possible to prevent the driver from driving with a fuel-inefficient accelerator level.

Second Embodiment

Display for Preventing Fluctuation of Accelerator Level

When the driver depresses the accelerator pedal 13, the engine output increases, and the driving force provided by the increased engine output is used for acceleration, hill climbing, and so on. However, when the accelerator pedal 13 is depressed only for a very short period of time, the driving force is consumed and converted into frictional heat, for example, by a torque converter before it is transmitted to the road surface. In other words, fuel consumed by depressing the accelerator pedal 13 for a very short period of time does not contribute to the increase in the driving force. Therefore, it is preferable to prevent such accelerator operations. A second embodiment of the present invention provides an accelerator level display device 1 capable of preventing fluctuation of the accelerator level. The accelerator level display device 1 of this embodiment adds up fluctuations of the amount of depressing the accelerator pedal 13 with respect to an average amount of depressing the accelerator pedal 13 (the added up fluctuations are hereafter called cumulative fluctuation) and if the cumulative fluctuation is large, displays the current indicator level with a rate of change greater than the rate of change of an actual accelerator level.

Figure 11:
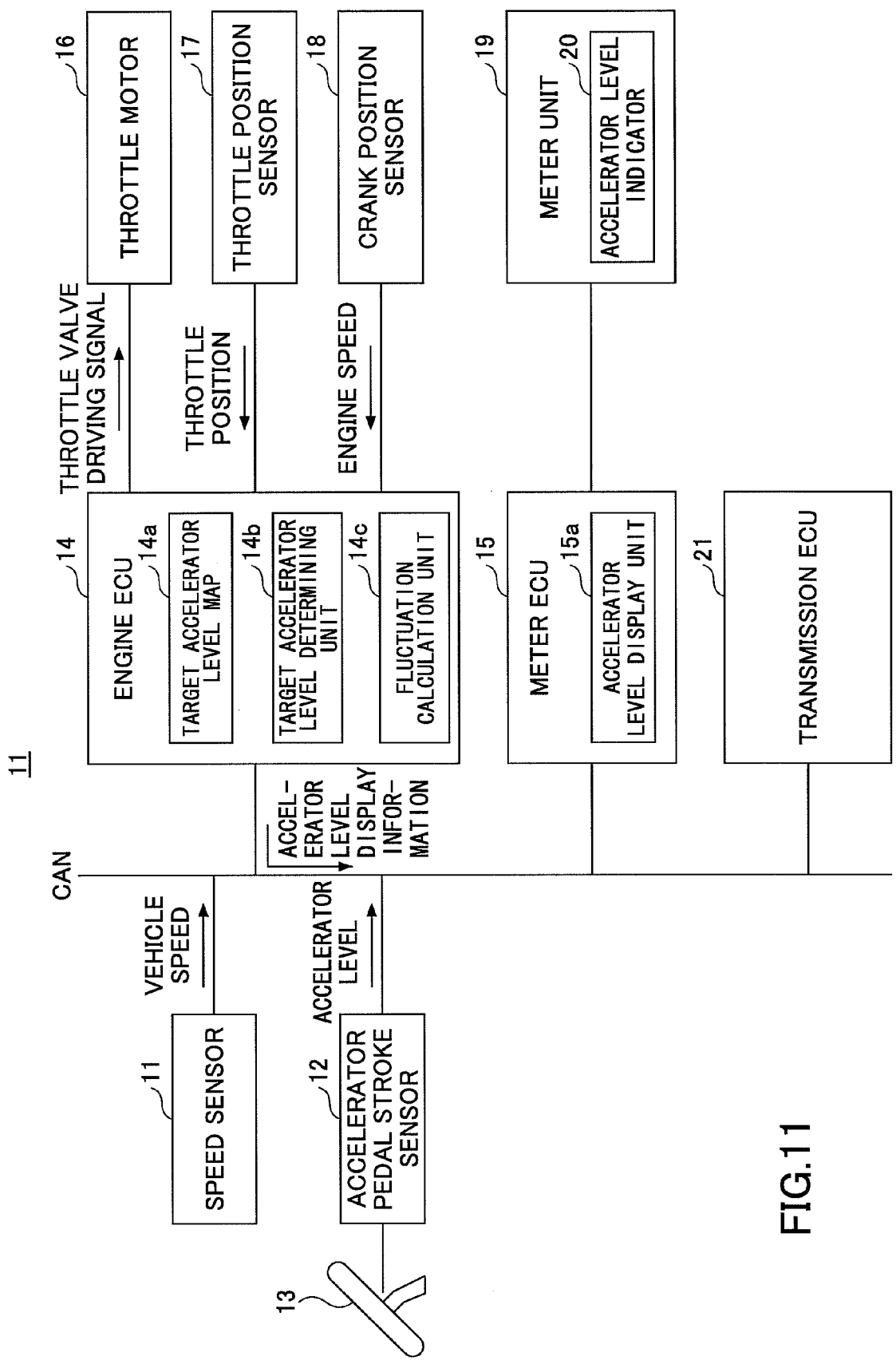
FIG. 11 is a functional block diagram of an accelerator level display device (second embodiment)

FIG. 11 is a functional block diagram of the accelerator level display device 1 according to the second embodiment. In FIG. 11, the same reference numbers are used for parts corresponding to those shown in FIG. 1, and descriptions of those parts are omitted. The accelerator level display device 1 of FIG. 11 includes a transmission ECU 21 and a fluctuation calculation unit 14c that is implemented by executing a program by the CPU. The transmission ECU 21 shifts the transmission to control the torque and calculates a rotational speed ratio R1 from an input axis rotational speed N1 and an output axis rotational speed N2 by a formula (N1−N2)/N1. The fluctuation calculation unit 14c calculates the cumulative fluctuation of the accelerator pedal 13.

Figure 12:
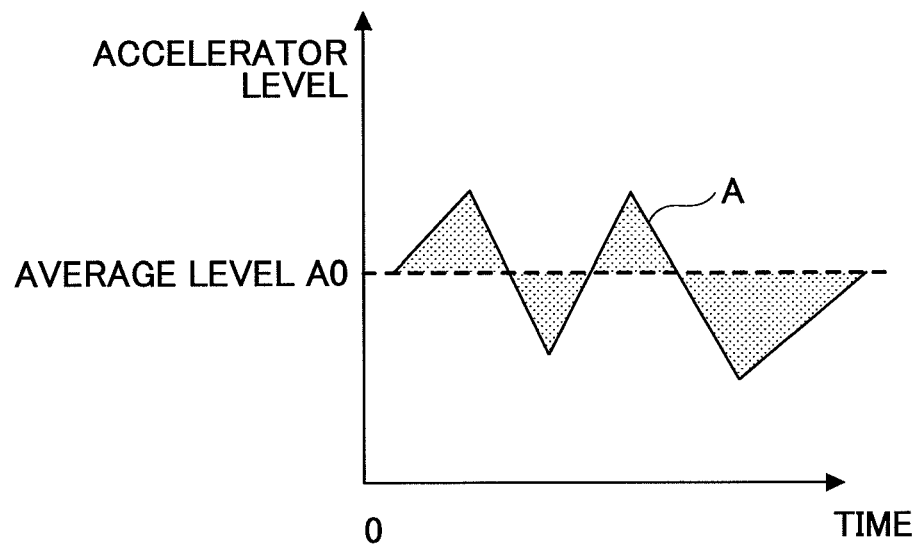
FIG. 12 is a graph showing exemplary fluctuations in the amount of depressing an accelerator pedal.

Calculation of the cumulative fluctuation is described below. FIG. 12 is a graph showing exemplary fluctuations in the amount of depressing the accelerator pedal 13. In FIG. 12, accelerator levels and an average accelerator level are shown with respect to time. The average accelerator level is obtained by averaging accelerator levels in several to tens of previous time cycles and is therefore substantially constant. The accelerator level fluctuates as shown by shaded areas in FIG. 12 if the accelerator pedal 13 is repeatedly depressed for a short period of time. The cumulative fluctuation is obtained by adding up the shaped areas.

The fluctuation calculation unit 14c calculates the cumulative fluctuation by totaling the differences (absolute values) between an average of previous accelerator levels and current accelerator levels.

More specifically, the fluctuation calculation unit 14c calculates the cumulative fluctuation by the following formula:

$$D = \int |A - A0| dt$$

In the formula, A indicates a detected accelerator level, A0 indicates an average of previous accelerator levels A, and D indicates the cumulative fluctuation. The cumulative fluctuation is an integral of absolute values of differences obtained by subtracting the average accelerator level A0 from accelerator levels A detected within predetermined time.

Thus, the integral is a definite integral performed over the predetermined time. The predetermined time (e.g., from several seconds to ten or so seconds) is the duration for detecting fluctuations of the accelerator level in a short period of time that are different from adjustments of the accelerator level necessary to drive a vehicle.

If the cumulative fluctuation D is greater than or equal to a predetermined value D1, the accelerator level display unit 15a displays the current indicator level with a rate of change greater than the rate of change of the accelerator level. Meanwhile, if the cumulative fluctuation D is less than the predetermined value D1, the accelerator level display unit 15a displays the current indicator level as described with reference to FIG. 4 (b) or (c) in the first embodiment.

Figure 13:
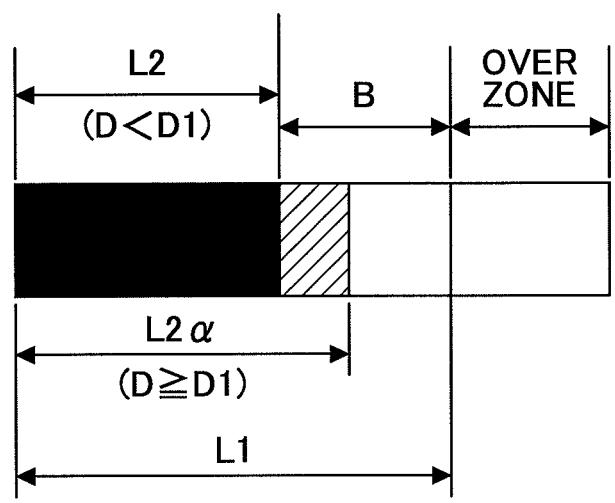
FIG. 13 is a drawing illustrating an accelerator level indicator that displays a change in a current indicator level in nonlinear proportion to a change in an accelerator level.

FIG. 13 is a drawing illustrating an accelerator level indicator 20 that displays a change in the current indicator level in nonlinear proportion to a change in the accelerator level. When the cumulative fluctuation D is less than the predetermined value D1, the accelerator level display unit 15a of the meter ECU 15 displays the target indicator level with a rectangle having a fixed length L1. Also, the accelerator level display unit 15a calculates a ratio R2 of an accelerator level to the target accelerator level and displays the current indicator level with a rectangle having a length L2=R2×L1. In this case, a level difference B is indicated by L1−L2. The driver is guided to increase the accelerator level by an amount indicated by the level difference B so that the accelerator level becomes close to the target accelerator level. When the length L2 is greater than the length L1, the level difference B is displayed in the over zone and the driver is guided to reduce the accelerator level by an amount indicated by the level difference B.

When the cumulative fluctuation D is greater than or equal to the predetermined value D1, the accelerator level display unit 15a displays the target indicator level, which corresponds to the target accelerator level, with a rectangle having the fixed length L1 and displays the current indicator level with a rectangle having a length L2 α that is obtained by the following formula:

$$L2\alpha = (K \times D + \eta \times (R1+1)) \times L2$$

In the formula, K indicates a fluctuation conversion factor and η indicates a rotational speed ratio conversion factor. The conversion factors are determined taking into account whether the cumulative fluctuation D or the rotational speed ratio R1 is more important as a factor for increasing the length L2.

In FIG. 13, the rectangle with the length L2α is the sum of the rectangle with the length L2 and a hatched portion. That is, when the cumulative fluctuation D is greater than or equal to the predetermined value D1, the current indicator level is displayed with a rectangle that is longer (by the length of the hatched portion) than the length L2 that is proportional to the accelerator level. In this case, the level difference B is indicated by L1−L2α.

In other words, when the cumulative fluctuation D is greater than or equal to the predetermined value D1, the accelerator level display unit 15a informs the driver that the accelerator pedal 13 is being depressed and released too frequently (hereafter called "flapping operation").

Figure 14:
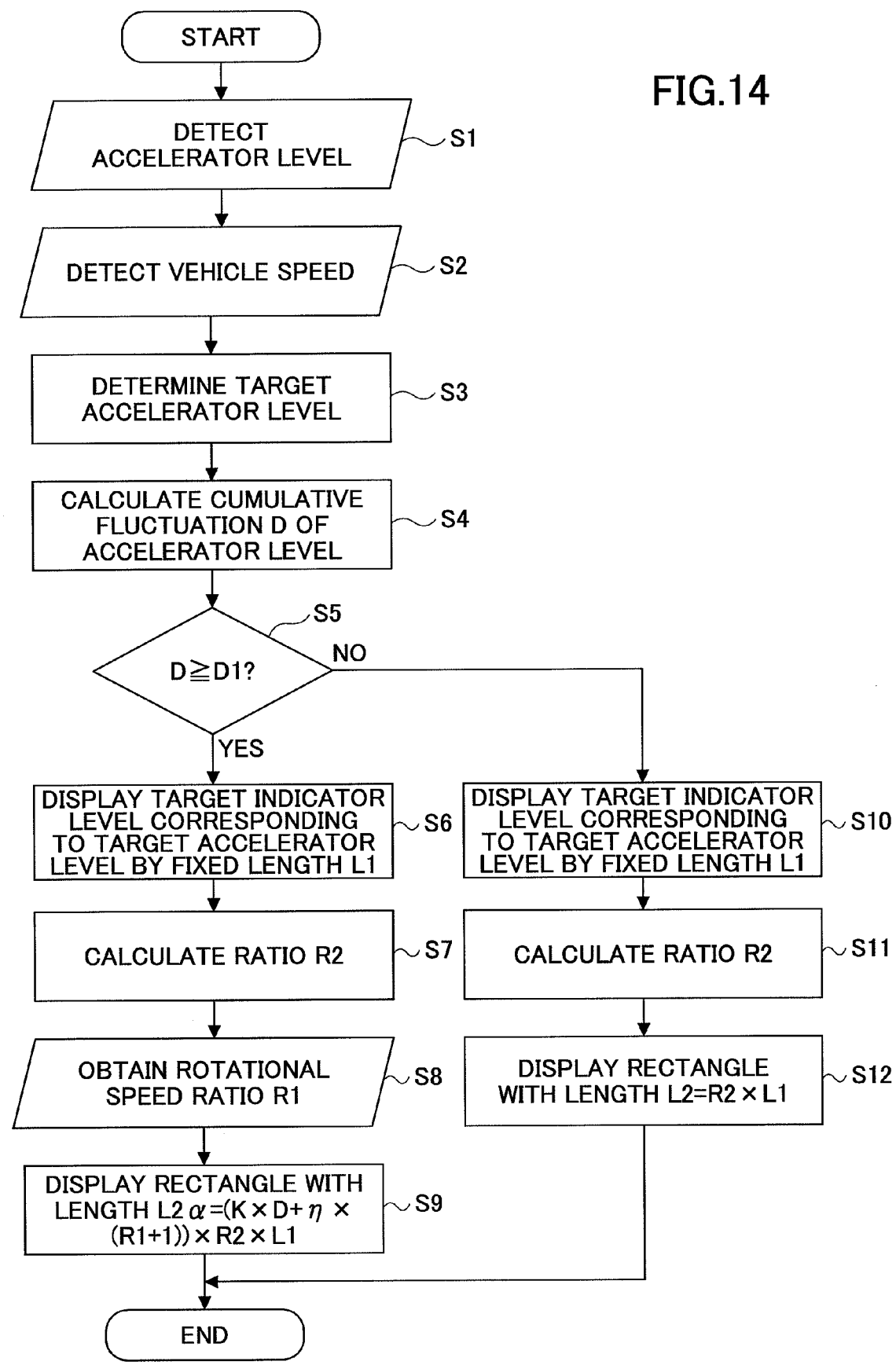
FIG. 14 is a flowchart showing a process performed by an accelerator level display device to display a current indicator level on an accelerator level indicator.

A control process in the accelerator level display device 1 is described below with reference to a flowchart. FIG. 14 is a flowchart showing a process performed by the accelerator level display device 1 to display a current indicator level on the accelerator level indicator 20.

The target accelerator level determining unit 14b receives an accelerator level detected by the accelerator pedal stroke sensor 12 in step S1 and receives a vehicle speed detected by the speed sensor 11 in step S2.

In step S3, the target accelerator level determining unit 14b of the engine ECU 14 determines a target accelerator level based on a map of accelerator levels and fuel economy as shown by FIG. 3 (a), a map of vehicle speeds and accelerator levels as shown by FIG. 3 (b), an engine speed detected by the crank position sensor 18, and the vehicle speed detected by the speed sensor 11.

In step S4, the fluctuation calculation unit 14c of the engine ECU 14 calculates the cumulative fluctuation D of the accelerator level, and the transmission ECU 21 calculates the rotational speed ratio R1=(N1−N2)/N1 from the input axis rotational speed N1 and the output axis rotational speed N2 of a transmission (not shown).

In step S5, the accelerator level display unit 15a of the meter ECU 15 determines whether the cumulative fluctuation D is greater than or equal to the predetermined value D1. If the cumulative fluctuation D is greater than or equal to the predetermined value D1, the process proceeds to step S6. If the cumulative fluctuation D is less than the predetermined value D1, the process proceeds to step S10.

In step 6, the accelerator level display unit 15a displays a target indicator level, which is expressed as a fixed value and corresponds to the target accelerator level, with a rectangle having a fixed length L1. In step S7, the accelerator level display unit 15a calculates a ratio R2 of the accelerator level to the target accelerator level.

In step S8, the accelerator level display unit 15a of the meter ECU 15 obtains the rotational speed ratio R1 from the transmission ECU 21. In step S9, the accelerator level display unit 15a displays a rectangle with a length L2α=(K×D+η×(R1+1))×R2×L1.

Meanwhile, in step 10, the accelerator level display unit 15a displays a target indicator level, which is expressed as a fixed value and corresponds to the target accelerator level, with a rectangle having a fixed length L1. In step S11, the accelerator level display unit 15a calculates a ratio R2 of the accelerator level to the target accelerator level.

In step 12, the accelerator level display unit 15a displays a current indicator level, which corresponds to the accelerator level, with a rectangle having a length L2=R2×L1.

According to the second embodiment, when the cumulative fluctuation D of the accelerator level is greater than or equal to the predetermined value D1, the accelerator level display unit 15a informs the user that the accelerator pedal 13 is being depressed and released too frequently (flapping operation) without necessitating the user moving the eyes away from the MID 34 of the meter unit 19 being controlled by the accelerator level display unit 15a, and thereby prevents the user from operating the accelerator pedal 13 in such a "flapping" manner.

The present invention is not limited to the specifically disclosed embodiments, and variations and modifications may be made without departing from the scope of the present invention.

For example, the accelerator level display unit 15a may be configured to change the brightness and/or color of a rectangle representing the current indicator level or the level difference B displayed on the MID 34 when the cumulative fluctuation D is greater than or equal to the predetermined value D1. Also, the meter unit 19 may include a lamp that is turned on or off when the cumulative fluctuation D is greater than or equal to the predetermined value D1. Further, the flapping operation may be reported to the user with text displayed on the MID 34 or with a sound output from a speaker or a buzzer provided in the meter unit 19.

In this embodiment, the ratio R2 of an accelerator level to a target accelerator level is obtained, the length L2 of a rectangle indicating a current indicator level is obtained by multiplying the length L1 of a rectangle indicating a target indicator level by the ratio R2, and the level difference B is obtained by subtracting the length L2 from the length L1. Alternatively, the level difference B may be obtained first based on the length L1 indicating the target indicator level, and the current indicator level may be obtained by subtracting the level difference B from the length L1.

In the above embodiment, the current indicator level is also obtained by a formula L2α=(K×D+η×(R1+1))×L2. The rotational speed ratio R1 in the formula indicates the transmission efficiency and also indicates a decrease in fuel-economy caused by a flapping operation.

Alternatively, the length L2 α of a rectangle indicating the current indicator level corresponding to the accelerator level may be obtained, without using the ratio R1, by multiplying the length L1 corresponding to the target indicator level by (K×D+1) and the ratio R2.

In the above embodiment, when the cumulative fluctuation D of the accelerator level is greater than or equal to the predetermined value D1, the current indicator level corresponding to the accelerator level is displayed longer than normal to inform the user that the accelerator pedal 13 is being depressed and released too frequently (flapping operation). Alternatively, a flapping operation may be reported to the user by displaying the level difference B longer than normal.

The present international application claims priority from Japanese Patent Application No. 2006-290318 filed on Oct. 25, 2006 and Japanese Patent Application No. 2007-028403 filed on Feb. 7, 2007, the entire contents of which are hereby incorporated herein by reference.

The invention claimed is:

1. An accelerator level display device, comprising:
   an accelerator level detection unit configured to detect an accelerator level;
   a target accelerator level determining unit configured to determine a target accelerator level; and
   a display unit configured to fix a display position of the target accelerator level and to display a level difference between the target accelerator level and the accelerator level relative to the fixed display position.

2. The accelerator level display device as claimed in claim 1, wherein the display unit is configured to display the level difference between the target accelerator level and the accelerator level by nonlinearly relating the accelerator level to an accelerator level indicator.

3. The accelerator level display device as claimed in claim 1, wherein an amount of change in the accelerator level indicator corresponding to a predetermined amount of change in the accelerator level varies according to the accelerator level.

4. The accelerator level display device as claimed in claim 2, wherein the display unit is configured to display the level difference by relating the accelerator level to the accelerator level indicator in such a manner that
   even when a first difference between a first accelerator level and a second accelerator level greater than the first accelerator level is the same as a second difference between a third accelerator level greater than the first accelerator level and a fourth accelerator level greater than the third accelerator level,
   if the accelerator level indicator crosses a predetermined threshold, a third difference between a first accelerator indicator corresponding to the first accelerator level and a second accelerator level indicator corresponding to the second accelerator level becomes different from a fourth difference between a third accelerator level indicator corresponding to the third accelerator level and a fourth accelerator level indicator corresponding to the fourth accelerator level.

5. The accelerator level display device as claimed in claim 4, wherein if the accelerator level indicator is greater than or equal to the predetermined threshold, the display unit is configured to display the level difference by relating the accelerator level to the accelerator level indicator such that the fourth difference becomes greater than the third difference.

6. The accelerator level display device as claimed in claim 4, wherein if the accelerator level indicator is less than the predetermined threshold, the display unit is configured to display the level difference by relating the accelerator level to the accelerator level indicator such that the third difference becomes smaller than the fourth difference.

7. The accelerator level display device as claimed in claim 2, wherein the display unit is configured to display the level difference by relating the accelerator level to the accelerator level indicator in such a manner that
   even when a first difference between a first accelerator level and a second accelerator level greater than the first accelerator level is constant,
   a second difference between a first accelerator level indicator corresponding to the first accelerator level and a second accelerator level indicator corresponding to the second accelerator level increases as the accelerator level indicator increases.

8. An accelerator level display method of displaying information based on an amount of operation of an accelerator pedal, comprising the steps of:
   detecting, by an accelerator level detection unit, an accelerator level;
   determining, by a target accelerator level determining unit, a target accelerator level;
   fixing, by a display unit, a display position of the target accelerator level; and
   displaying, by the display unit, a level difference between the target accelerator level and the accelerator level relative to the fixed display position.

* * * * *